(12) United States Patent
Fukuda et al.

(10) Patent No.: US 11,485,287 B2
(45) Date of Patent: Nov. 1, 2022

(54) ELECTRONIC MIRROR SYSTEM

(71) Applicant: DENSO CORPORATION, Kariya (JP)

(72) Inventors: Katsuyuki Fukuda, Kariya (JP); Tomoaki Iida, Toyota (JP); Goro Asai, Toyota (JP); Kunihiro Sugihara, Toyota (JP); Taichi Hasegawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 332 days.

(21) Appl. No.: 16/821,086

(22) Filed: Mar. 17, 2020

(65) Prior Publication Data

US 2020/0215978 A1      Jul. 9, 2020

Related U.S. Application Data

(63) Continuation of application No. PCT/JP2018/034055, filed on Sep. 13, 2018.

(30) Foreign Application Priority Data

Sep. 19, 2017   (JP) .............................. JP2017-179480

(51) Int. Cl.
*B60R 1/00* (2022.01)
*B60R 16/02* (2006.01)
*H01H 25/04* (2006.01)
*H04N 5/232* (2006.01)
*H04N 7/18* (2006.01)

(52) U.S. Cl.
CPC .............. *B60R 1/006* (2013.01); *B60R 16/02* (2013.01); *H01H 25/041* (2013.01); *H04N 5/232* (2013.01); *H04N 7/18* (2013.01); *B60R 2300/10* (2013.01); *B60R 2300/802* (2013.01)

(58) Field of Classification Search
None
See application file for complete search history.

(56) References Cited

U.S. PATENT DOCUMENTS

| 2005/0093368 A1* | 5/2005 | Takaku | B60K 37/06 307/10.1 |
| 2012/0162427 A1* | 6/2012 | Lynam | H04N 7/188 348/148 |

(Continued)

FOREIGN PATENT DOCUMENTS

| DE | 10 2011 118 253 A1 | 5/2013 |
| JP | S5899152 U | 7/1983 |

(Continued)

*Primary Examiner* — Rebecca A Volentine
(74) *Attorney, Agent, or Firm* — Maschoff Brennan (57) ABSTRACT

An electronic mirror system includes: a camera for capturing images of surroundings of a vehicle; a display unit for displaying an image captured by the camera; a switch unit including an adjustment switch and a multi-function switch; and a control unit for performing a process according to a signal from the switch unit. When the multi-function switch is operated, the control unit executes a process selected from a plurality of set processes according to a state of the vehicle; and in a case where the executed process is a transition to a mode for changing setting information of the system, and when the adjustment switch is operated after the transition, the control unit changes the setting information according to a signal from the adjustment switch.

7 Claims, 5 Drawing Sheets

(56) References Cited

U.S. PATENT DOCUMENTS

| | | | | |
|---|---|---|---|---|
| 2012/0314072 A1* | 12/2012 | Kiyo | ...................... | H04N 7/181 |
| | | | | 348/148 |
| 2013/0030660 A1* | 1/2013 | Fujimoto | ............... | B60K 35/00 |
| | | | | 701/50 |
| 2013/0204459 A1 | 8/2013 | Enami et al. | | |
| 2014/0285666 A1* | 9/2014 | O'Connell | ................ | B60R 1/12 |
| | | | | 348/148 |
| 2015/0085120 A1 | 3/2015 | Heinemann | | |
| 2016/0134845 A1* | 5/2016 | Asai | ...................... | H04N 7/181 |
| | | | | 348/234 |
| 2016/0227123 A1* | 8/2016 | Nagase | .................. | H04N 5/247 |

FOREIGN PATENT DOCUMENTS

| | | | |
|---|---|---|---|
| JP | S6171250 | A | 4/1986 |
| JP | S6428047 | A | 1/1989 |
| JP | 2000159018 | A | 6/2000 |
| JP | 2006-096249 | A | 4/2006 |
| JP | 2006096249 | A | 4/2006 |
| JP | 2008-030674 | A | 2/2008 |
| JP | 2008030674 | A | 2/2008 |
| JP | 2009-241689 | A | 10/2009 |
| JP | 2012096670 | A | 5/2012 |
| JP | 2013159273 | A | 8/2013 |

* cited by examiner

ELECTRONIC MIRROR SYSTEM

This application is the U.S. bypass application of International Application No. PCT/JP2018/034055 filed Sep. 13, 2018 which designated the U.S. and claims priority to Japanese Patent Application No. 2017-179480, filed Sep. 19, 2017, the contents of which are incorporated herein by reference.

BACKGROUND

Technical Field

The present disclosure relates to an electronic mirror system.

Description of the Related Art

Electronic mirror system is known. An electronic mirror system is provided with the side mirrors of a vehicle as a digital device. The electronic mirror system requires functions and operations such as system startup, image quality adjustment, and the like.

SUMMARY

The present disclosure provides an electronic mirror system capable of suppressing an increase in the number of required switches.

According to one aspect of the present disclosure, an electronic mirror system mounted in a vehicle, includes: a camera for capturing images of surroundings of the vehicle; a display unit for displaying an image captured by the camera; a switch unit including an adjustment switch and a multi-function switch; and a control unit for performing a process according to a signal from the switch unit.

DETAILED DESCRIPTION OF THE PREFERRED EMBODIMENTS

In an electronic mirror system in which the side mirrors of a vehicle are provided as a digital device, in order to meet legal requirements and to improve user convenience, functions and operations such as system startup, image quality adjustment, and the like that are not necessary with conventional optical side mirrors, are required. In addition, preferably the electronic mirror system also has a function corresponding to adjustment of the angle of the mirror surfaces of the optical side mirrors, storage of the side mirrors, and the like. Accordingly, a switch for operating the conventional functions and the newly required functions is required.

As an input device mounted in a vehicle, for example, JP 2012-096670A proposes an input device in which a plurality of switches are added to the steering wheel according to a required function.

According to the above-mentioned patent literature, when a switch is added for each function that is added as described in the, the number of switches increases. However, many switches are already mounted on the instrument panel, the door, the steering wheel, and the like, and it is difficult to add more switches.

Moreover, since it is expected that in the future, electronic mirrors and optical side mirrors will be optionally selected in one vehicle model, preferably a common switch will be used for the electronic mirrors and the optical side mirrors.

Therefore, it is necessary to suppress an increase in the number of switches due to a use of digital device for the side mirrors.

Hereinafter, embodiments of the present disclosure will be described with reference to the drawings. Note that in the following embodiments, portions that are the same or equivalent are described by using the same reference numerals.

First Embodiment

A first embodiment will be described. The electronic mirror system according to the present embodiment is mounted in a vehicle, and shows a driver the situation on the sides of the vehicle and in front of and behind the vehicle.

Figure 1:
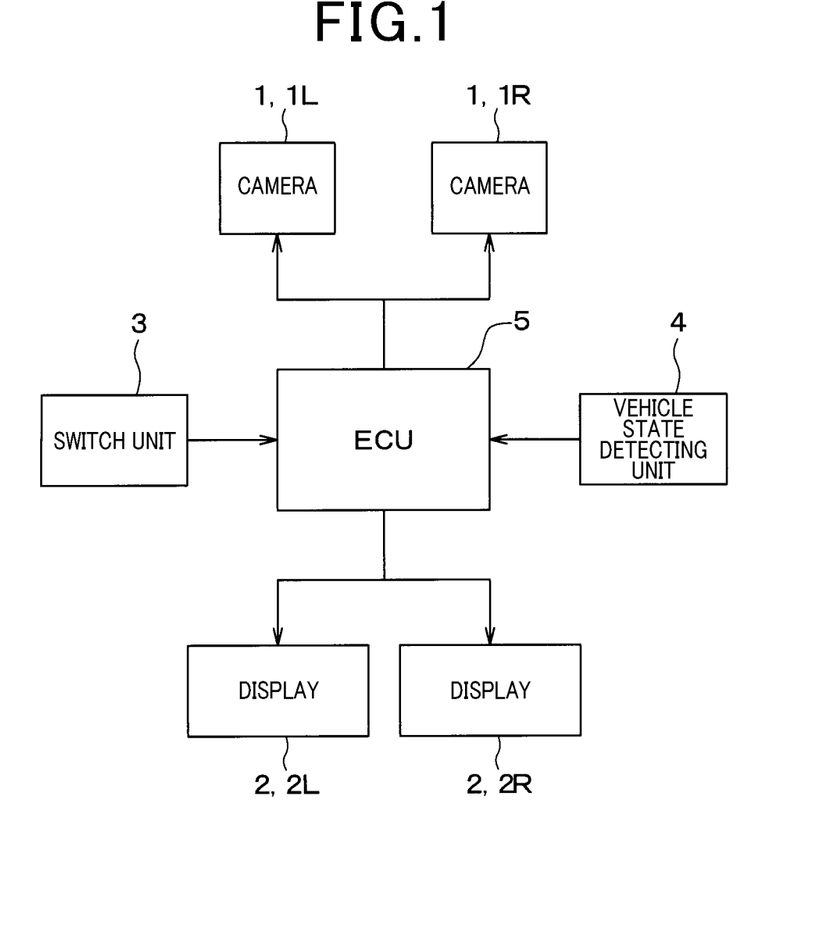
FIG. 1 is a configuration diagram of an electronic mirror system according to a first embodiment.

As illustrated in FIG. 1, the electronic mirror system includes a camera 1 that captures an image around the vehicle, a display 2 that is a display unit for displaying a captured image of the camera 1, and a switch unit 3 for performing operation of the camera 1, the display 2, and the like. In addition, the electronic mirror system includes a vehicle state detecting unit 4 that detects a state of the vehicle, and an ECU 5 as a control unit that performs a process according to signals from the switch unit 3 and the vehicle state detecting unit 4.

As the camera 1, a camera 1L for capturing an image of the left side and the left rear of the vehicle and a camera 1R for capturing an image of the right side and the right rear of the vehicle are installed. In addition, as the display 2, a display 2L and a display 2R for respectively displaying images captured by the camera 1L and the camera 1R are provided.

The camera 1L is attached to the left front door of the vehicle, and outputs a video signal representing a scene on the left side and the left rear of the vehicle. The camera 1R is attached to the right front door of the vehicle, and outputs a video signal representing a scene on the right side and the right rear of the vehicle.

The display 2L and the display 2R are respectively disposed on the left and right sides of an instrument panel (so-called instrument panel) in the vehicle interior, and are visible by driver sitting in the driver's seat. The display 2 includes, for example, a liquid-crystal panel, an organic EL (electroluminescence) panel or the like.

Figure 2:
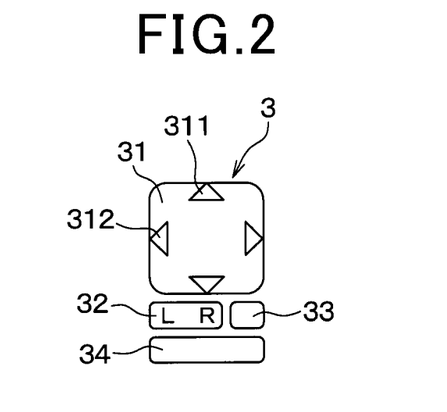
FIG. 2 is a diagram illustrating a configuration of a switch unit.

As illustrated in FIG. 2, the switch unit 3 includes an adjustment switch 31, an LR switch 32, a camera storage switch 33, and a multi-function switch 34. Of these, the adjustment switch 31, the LR switch 32, and the camera storage switch 33 are also used in a vehicle having optical side mirrors instead of the electronic mirror system. In other words, the switch unit 3 has a configuration in which a multi-function switch 34 is added to a switch unit installed in a vehicle having optical side mirrors. The adjustment switch 31 is configured by a combination of an UP/DOWN key 311 and a LEFT/RIGHT key 312. In the present embodiment, the UP/DOWN key 311 is used as a key for switching an adjustment mode described later, and corresponds to a first adjustment key. In addition, the LEFT/RIGHT key 312 is used as a key for changing setting information and the like of the display 2 and corresponds to a second adjustment key. Note that in a vehicle provided with optical side mirrors, the adjustment switch 31 is used as a switch for adjusting the angle of the side mirrors.

The LR switch 32 is used for selecting a target from the camera 1L and the camera 1R, the setting information of which is to be changed, by operating the left/right key 312. In other words, when the LR switch 32 is pressed down on the L side, the camera 1L is selected as the camera 1 for changing the setting information, and when the LR switch 32 is pressed down on the R side, the camera 1R is selected as the camera 1 for changing the setting information. Note that in a vehicle provided with optical side mirrors, the LR switch 32 is used as a switch for selecting a target from the two side mirrors arranged on the left and right sides of the vehicle, the angle of which is to be adjusted.

The camera storage switch 33 is for storing the camera 1 installed outside the vehicle body. Note that in a vehicle provided with optical side mirrors, the camera storage switch 33 is used as a switch for storing the side mirrors.

The multi-function switch 34 is newly added to a switch unit of a vehicle having optical side mirrors, and the operation of the electronic mirror system when the multi-function switch 34 is pressed changes depending on the state of the vehicle.

The vehicle state detecting unit 4 detects a state of the vehicle such as a shift lever position, a vehicle speed, an ignition state, a headlight state, and the like, and outputs a signal according to the detected state.

The ECU 5 is arranged, for example, in the instrument panel, and is electrically connected to the camera 1 and the display 2 as illustrated in FIG. 1. The ECU 5 transmits a video signal from the camera 1L to the display 2L and transmits a video signal from the camera 1R to the display 2R.

The ECU 5 is also electrically connected to the switch unit 3 so that operation information of the switch unit 3 is inputted. The ECU 5 is also electrically connected to the vehicle state detecting unit 4 so as to acquire the vehicle state from the vehicle state detecting unit 4.

The ECU 5 is configured by a well-known microcomputer that includes a CPU, a ROM, a RAM, and the like, and peripheral circuits thereof. The ROM and RAM are non-transitory substantive storage media. The ECU 5 stores a plurality of setting information regarding the camera 1 and the display 2, changes output signals to the camera 1 and the display 2 based on the stored setting information, operates the camera 1 and operates the contents to be displayed by the display 2.

As setting information, for example, the ECU 5 stores storage information and display area information of the camera 1, and brightness information, contrast information, and anti-glare information of an image displayed on the display 2. In addition, as setting information, the ECU 5 stores wide view angle display information at the time of moving backward that is related to a wide viewing angle display of the displays 2R and 2L when the vehicle is moving backward, and intersection wide viewing angle display information that is related to a wide viewing angle display on the displays 2R and 2L when the vehicle enters an intersection The ECU 5 acquires camera storage information when the ignition is turned OFF, and stores the camera 1 according to the acquired information. In addition, the ECU 5 performs trimming of an image captured by the camera 1 according to the display area information, and adjusts the image area displayed on the display 2. Moreover, the ECU 5 adjusts the brightness and contrast of the image displayed on the display 2 according to the brightness information, the contrast information and the anti-glare information, and switches the anti-glare mode between ON and OFF. Furthermore, the ECU 5 switches ON and OFF the wide viewing angle display of the display 2 in accordance with backing wide viewing angle display information and intersection wide viewing angle display information.

Figure 3:
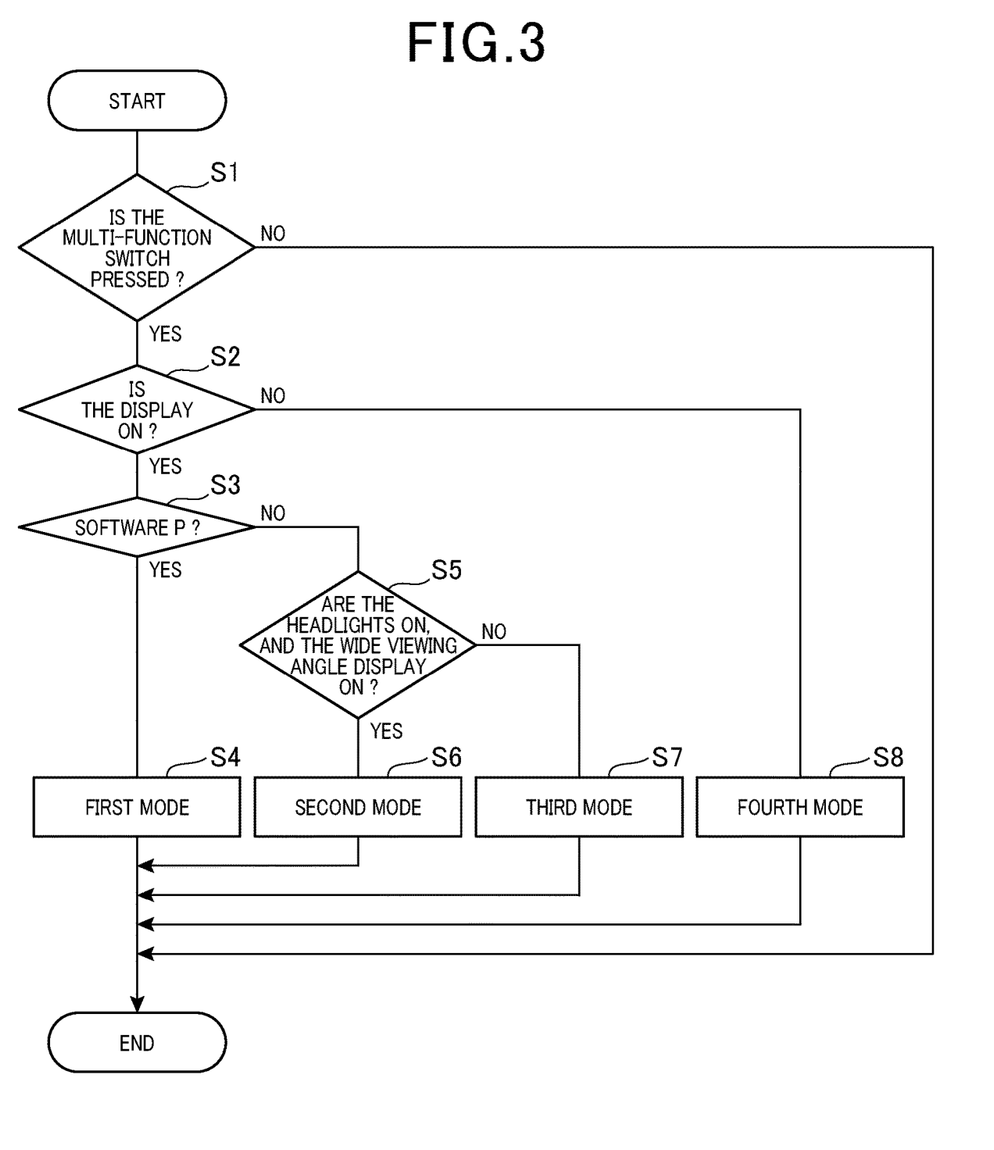
FIG. 3 is a flowchart of a mode transition process executed by an ECU.

The operation of the electronic mirror system will be described with reference to FIG. 3 to FIG. 7. When the multi-function switch 34 is operated, the ECU 5 executes a process selected from a plurality of set processes according to the state of the vehicle. In a case where the executed process is a transition to a mode for changing the setting information of the system, and the adjustment switch 31 is operated after the transition to the mode, the ECU 5 changes the system setting information according to a signal from the adjustment switch 31. FIG. 3 is a flowchart of the mode transition process executed by the ECU 5.

The ECU 5 transitions to each mode by the process of steps S1 to S8 illustrated in FIG. 3. When the mode transition process is started, the ECU 5 determines in step Si whether or not the multi-function switch 34 is pressed. When it is determined that the multi-function switch 34 is pressed, the ECU 5 proceeds to step S2, and when it is determined that the multi-function switch 34 is not pressed, the ECU 5 ends the mode transition process.

In step S2, the ECU 5 determines whether or not the display 2 has been activated. When it is determined that the display 2 is activated, the ECU 5 proceeds to step S3, and determines whether or not the shift position is the parking position. When it is determined that the shift position is the parking position, the ECU 5 proceeds to step S4, selects the first mode as the mode to transition to, and ends the mode transition process.

When it is determined in step S3 that the shift position is not the parking position, the ECU 5 proceeds to step S5, and determines whether or not the headlights are ON and whether or not the wide viewing angle display on the display 2 is ON. When it is determined that the headlights are ON and the wide viewing angle display on the display 2 is ON, the ECU 5 proceeds to step S6, selects the second mode as the mode to transition to, and ends the mode transition process.

When it is determined that the headlights are not ON or that the wide viewing angle display on the display 2 is not ON, the ECU 5 proceeds to step S7, selects the third mode as the mode to transition to, and ends the mode transition process.

When it is determined in step S2 that the display 2 is not activated, the ECU 5 proceeds to step S8, selects the fourth mode as the mode to transition to, and ends the mode transition process. When the mode transition process ends, the ECU 5 transitions to the mode selected as the transition destination.

The first mode will be described with reference to FIG. 4. As described above, in a case where the display 2 is activated and the shift position is the parking position when the multi-function switch 34 is operated, the ECU 5 transitions to the first mode. Then, as indicated by the white arrow in FIG. 4, the mode transitions from the normal mode to the adjustment mode of the camera 1 and the display 2, and text and the like corresponding to the adjustment items is displayed on the display 2.

Note that FIG. 4 and FIG. 5 to FIG. 7, that will be described later, illustrate the display contents of the display 2R in each mode in a case where an electronic mirror system is mounted in a vehicle traveling in an area having traffic restrictions such that the vehicle travels on the left side. In FIG. 4 to FIG. 7, the setting item names are displayed using text; however, the setting items may be displayed using icons.

Figure 4:
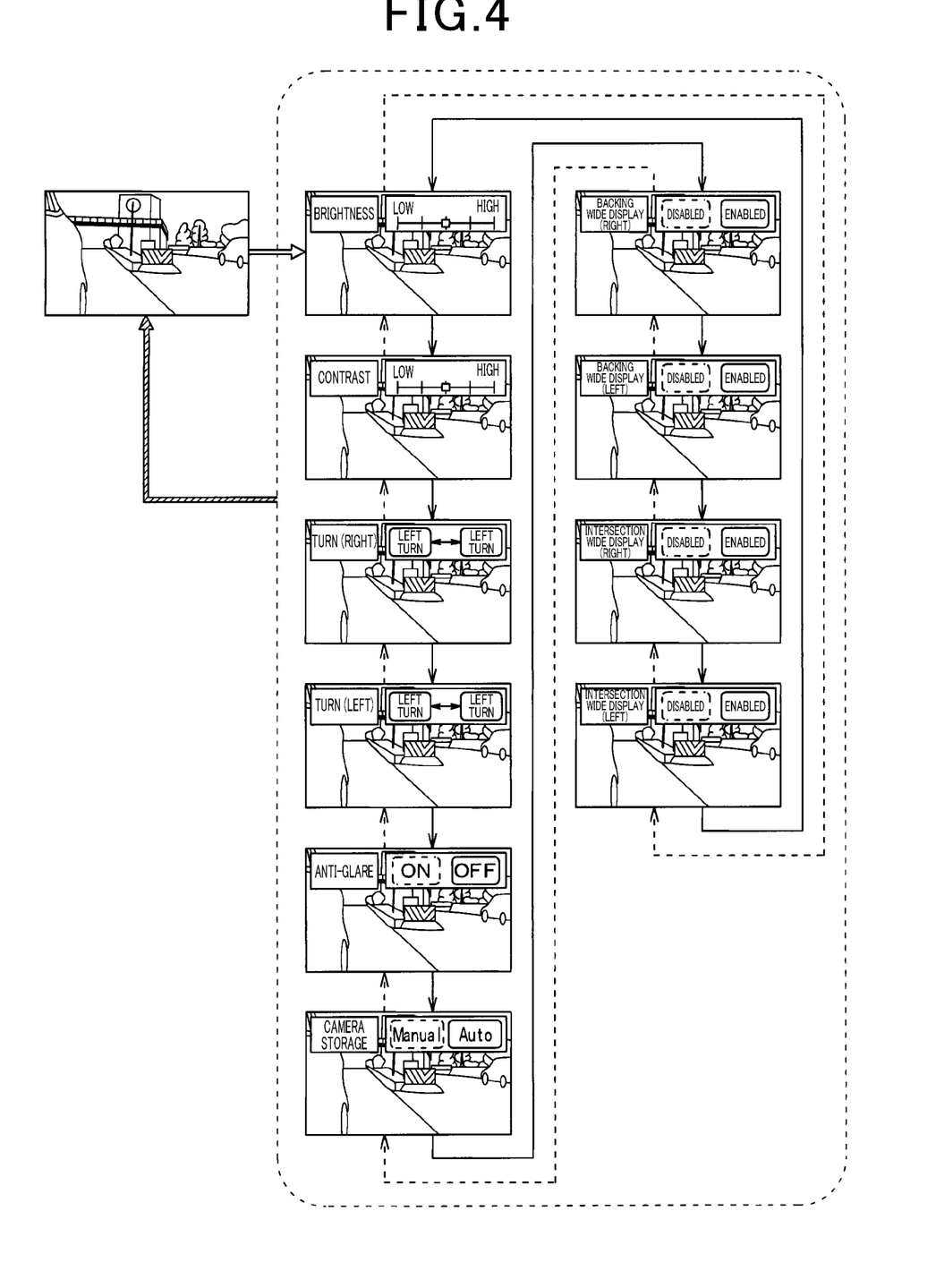
FIG. 4 is a diagram for describing a first mode.

As illustrated in FIG. 4, in the first mode, by operating the UP/DOWN key 311 in the downward direction, the adjustment mode is switched as indicated by the solid arrows. In other words, the adjustment modes are switched in the order: brightness information, contrast information, display area information of the displays 2R, 2L, anti-glare information, camera storage information, backing wide viewing angle display information of the displays 2R, 2L, and intersection wide viewing angle display information of the displays 2R, 2L. By operating the UP/DOWN key 311 in the upward direction, the adjustment mode is switched in the reverse order, as indicated by the dashed arrows.

Note that in the adjustment mode of the display area of the display 2R, the mode may be switched to the adjustment mode of the display area of the display 2L by operating the LR switch 32 in the L direction. In addition, in the adjustment mode of the display area of the display 2L, the operation may be switched to the adjustment mode of the display area of the display 2R by operating the LR switch 32 in the R direction.

Moreover, a menu corresponding to each adjustment mode is displayed on the display 2. Then, when the multi-function switch 34 is operated in any of the adjustment modes or the switch unit 3 is not operated for a certain period of time, the adjustment mode ends as indicated by the outline hatched arrow, the adjustment menu is deleted and the display contents of the display 2 become the normal display.

In each adjustment mode, the setting information is changed by operating the LEFT/RIGHT key 312. In other words, in the brightness information adjustment mode, the brightness level of the image displayed on the display 2 is changed by operating the LEFT/RIGHT key 312. For example, by operating the LEFT/RIGHT key 312 to the right increases the brightness level by one step, and operating the LEFT/RIGHT key 312 to the left decreases the brightness level by one step. In addition, in the contrast information adjustment mode, the contrast level of the image displayed on the display 2 is changed in the same manner as the brightness information.

Moreover, in the adjustment mode of the display area information of the display 2R, the image area displayed on the display 2R is adjusted by operating the LEFT/RIGHT key 312. For example, operating the LEFT/RIGHT key 312 to the right moves the image area displayed on the display 2R to the right, and operating the LEFT/RIGHT key 312 to the left moves the image area displayed on the display 2R to the left. Similarly, in the adjustment mode of the display area information of the display 2L, the image area displayed on the display 2L is adjusted by operating the LEFT/RIGHT key 312.

In the anti-glare information adjustment mode, the settings of the camera 1 and the display format or the like of the display 2 are switched between a normal mode and an anti-glare mode for reducing glare by operating the LEFT/RIGHT key 312. In the camera storage information adjustment mode, the setting of whether or not to automatically store the camera 1 when the ignition is turned OFF is switched by operating the LEFT/RIGHT key 312.

Moreover, in the adjustment mode of the backing wide view angle display information and the intersection wide view angle display information of the display 2R, the wide viewing angle display of the display 2R is switched between ON and OFF by operating the LEFT/RIGHT key 312. For example, by operating the LEFT/RIGHT key 312 to the right, the wide viewing angle display on the display 2R is turned ON, and by operating the LEFT/RIGHT key 312 to the left, the wide viewing angle display on the display 2R is turned OFF. Similarly, in the adjustment mode of the backing wide view angle display information and the intersection wide view angle display information of the display 2L, the wide viewing angle display of the display 2L is switched between ON and OFF by operating the LEFT/RIGHT key 312.

As described above, when the multi-function switch 34 is operated while the vehicle is stopped, the ECU 5 transitions to the adjustment mode for changing the setting information related to the camera 1 and the display 2. Then, when the adjustment switch 31 is operated in the adjustment mode, the ECU 5 changes the setting information of the system according to a signal from the adjustment switch 31. In the present embodiment, a plurality of adjustment modes are prepared corresponding to a plurality of setting information for the camera 1 and the display 2; and when the LEFT/RIGHT key 312 is operated in each adjustment mode, the ECU 5 changes the system setting information according to a signal from the LEFT/RIGHT key 312. Then, when the UP/DOWN key 311 is operated, the ECU 5 transitions from the current adjustment mode to a different adjustment mode.

The second mode will be described with reference to FIG. 5. As described above, when the display 2 is activated, the shift position is not the parking position, the headlights are ON, and the wide viewing angle display of the display 2 is ON, the ECU 5 transitions to the second mode.

The headlights are turned ON when the surroundings of the vehicle are dark, for example, at night or the like. Moreover, the wide viewing angle display of the display 2 is turned ON when the backing wide viewing angle display is ON and the shift position is the reverse position, or the intersection wide viewing angle display is turned ON when the vehicle enters an intersection or the like.

Figure 5:
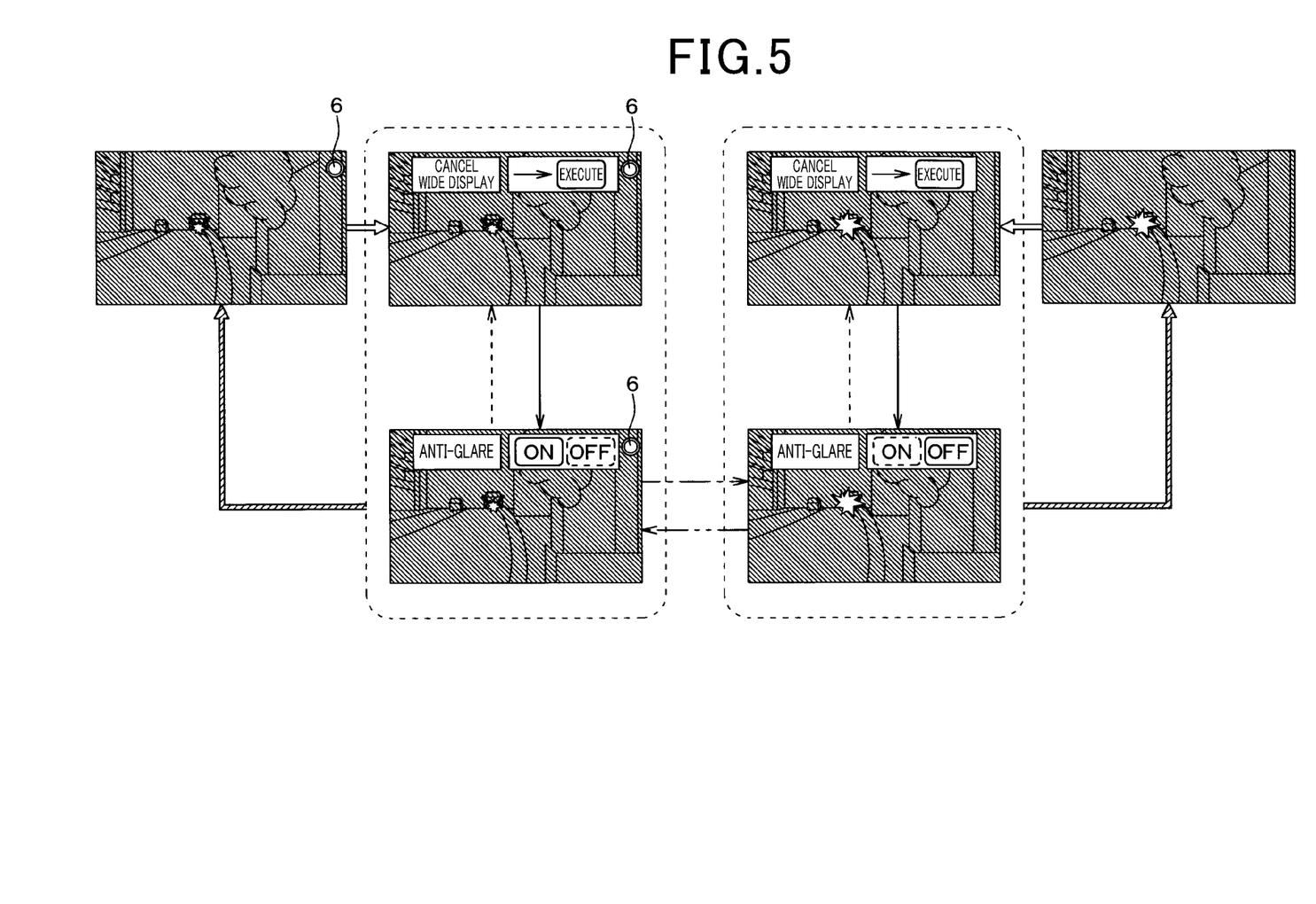
FIG. 5 is a diagram for describing a second mode.

As illustrated in FIG. 5, in the second mode, by operating the UP/DOWN key 311 in the downward direction, the mode transitions to the anti-glare information adjustment mode as indicated by the solid arrow, and by operating the UP/DOWN key 311 in the upward direction, the mode transitions to the wide viewing angle display adjustment mode as indicated by the dashed arrows.

Note that in FIG. 5, bright portions and dark portions are distinguished by the presence or absence of hatching. The portions without hatching are positions that are brighter than portions with hatching.

Similar to the first mode, the display 2 displays a menu corresponding to each mode. Then, when the multi-function switch 34 is operated in any of the adjustment modes or the switch unit 3 is not operated for a certain period of time, the adjustment mode ends as indicated by the outline hatched arrow, the adjustment menu is deleted and the display contents of the display 2 become the normal display.

In the anti-glare information adjustment mode, by operating the LEFT/RIGHT key 312 to the right, the anti-glare mode is turned OFF as indicated by the dash-dot arrow.

Moreover, by operating the LEFT/RIGHT key 312 to the left, the anti-glare mode is turned ON as indicated by the two-dot chain line arrow.

Note that when the anti-glare mode is ON, an icon 6 indicating that the anti-glare mode is ON is displayed on the display 2 as illustrated in FIG. 5.

In the wide viewing angle display adjustment mode, by operating the LEFT/RIGHT key 312 to the right, the wide viewing angle display is canceled.

The third mode will be described with reference to FIG. 6. As described above, when the display 2 is activated, the shift position is not the parking position, the headlights are not turned ON or the wide viewing angle display of the display 2 is not turned ON, the ECU 5 transitions to the third mode. For example, when the surroundings of the vehicle are bright such as in the daytime or the like, transition to the third mode is performed.

Figure 6:
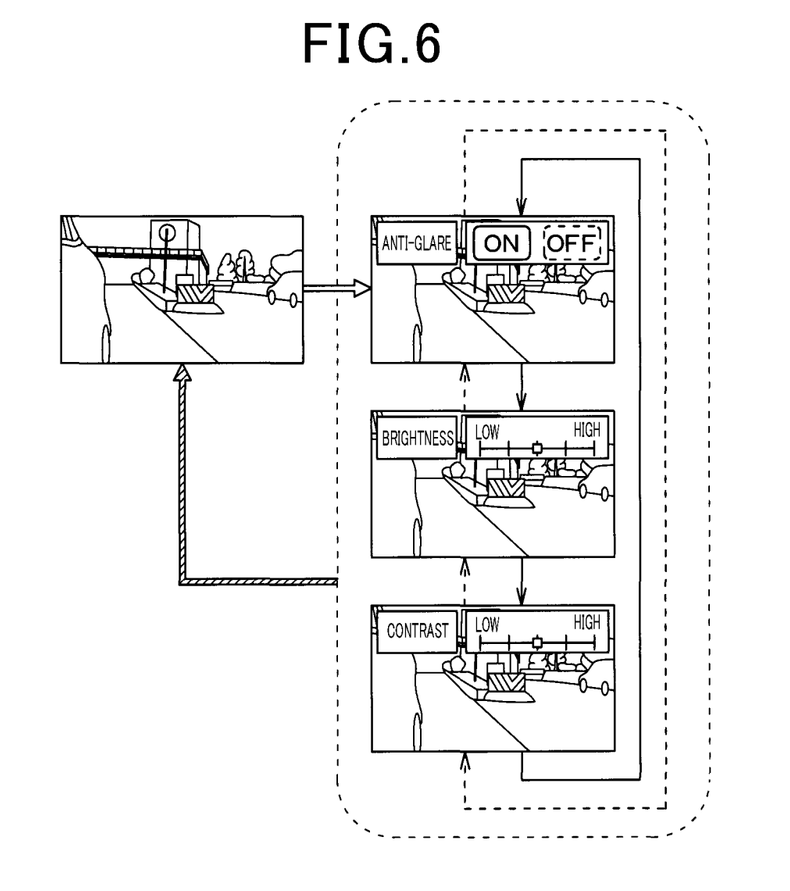
FIG. 6 is a diagram for describing a third mode.

As illustrated in FIG. 6, in the third mode, by operating the UP/DOWN key 311 in the downward direction, the adjustment mode is switched in the order of anti-glare information, brightness information, and contrast information as indicated by the solid arrow. By operating the UP/DOWN key 311 in the upward direction, the adjustment mode is switched in the reverse order, as indicated by the dashed arrows.

In addition, similar to the first mode, the display 2 displays a menu corresponding to each adjustment mode. The operation when the switch unit 3 is operated in each adjustment mode is the same as that in the first mode. Then, when the multi-function switch 34 is operated in any of the adjustment modes or the switch unit 3 is not operated for a certain period of time, the adjustment mode ends as indicated by the outline hatched arrow, the adjustment menu is deleted and the display contents of the display 2 become the normal display.

Figure 7:
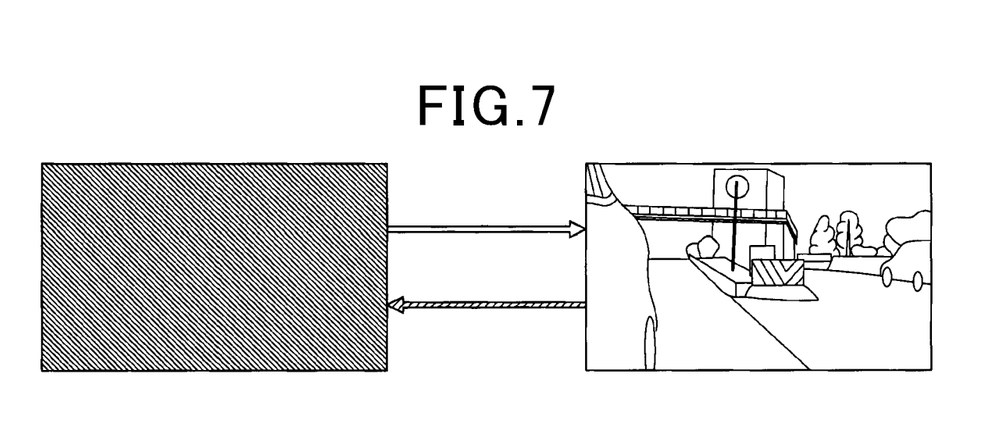
FIG. 7 is a diagram for describing a fourth mode.

The fourth mode will be described with reference to FIG. 7. As described above, when the display 2 is not activated, the ECU 5 transitions to the fourth mode. In the fourth mode, the display on the display 2 is turned ON by operating the multi-function switch 34, as indicated by the white arrow in FIG. 7. Then, when a certain period of time elapses without operating the multi-function switch 34 with the ignition turned OFF, the display 2 is turned OFF as indicated by the outline hatched arrow.

In this way, the processing performed when the multi-function switch 34 is operated changes according to the vehicle state. As the adjustment switch 31 for changing the setting information of the system, a mirror angle adjustment switch in a vehicle including an optical side mirrors is used. Therefore, it is not necessary to newly install a switch for each of a plurality of set processes, and it is possible to suppress an increase in the number of switches.

Other Embodiments

Note that the present disclosure is not limited to the embodiments described above, and may be appropriately changed. Moreover, in the embodiments described above, needless to say, that elements of the embodiment are not absolutely essential, unless otherwise clearly indicated as being essential or in principle considered to be clearly essential, or the like.

For example, the UP/DOWN key 311 may be used as a second adjustment key, and the LEFT/RIGHT key 312 may be used as a first adjustment key.

In addition, in the first embodiment described above, the adjustment mode is switched by using the UP/DOWN key 311; however, the adjustment mode may be switched by using the multi-function switch 34. When the multi-function switch 34 is operated while the vehicle is stopped, the plurality of adjustment modes and a normal mode may be sequentially switched, and when the UP/DOWN key 311 is operated in each adjustment mode, the setting information corresponding to each adjustment mode may be performed.

Further, when the plurality of adjustment modes and a normal mode are sequentially switched by operating the multi-function switch 34 as described above, two items of setting information may be adjusted simultaneously. For example, a menu for brightness adjustment and a menu for contrast adjustment may be simultaneously displayed on the display 2, and the brightness may be changed by operating the UP/DOWN key 311 and the contrast may be changed by operating the LEFT/RIGHT key 312.

Moreover, in the first embodiment described above, the camera storage information, the display area information, the brightness information, the contrast information, the anti-glare information, the backing wide viewing angle display information, and the intersection wide viewing angle display information are set for the camera 1 and the display 2; however, other information may also be additionally set. For example, the electronic mirror system may include a function of automatically changing the display format or the display area of the display 2 when the vehicle is backing up or turning left or right, and information regarding turning ON/OFF of such a function may be set. In the first and third modes, the order of switching between the adjustment modes may be changed.

Moreover, in a case where there is a switch that is not being used in the switch unit of the electronic mirror system of a vehicle having optical side mirrors, the switch may be used as the multi-function switch 34. For example, in a case where the electronic mirror system does not have a function of storing the camera 1, the camera storage switch 33 may be used as a multi-function switch. In this way, by using a switch that becomes unnecessary when the mirrors are digitized as a multi-function switch, it is possible to further suppress an increase in the number of switches.

Furthermore, the number of adjustment modes may be increased or decreased according to the vehicle speed. For example, the number of adjustment modes may be larger at low speeds than at high speeds.

Moreover, the multi-function switch 34 may be configured to include a liquid-crystal panel on the upper surface, for example, and text or icons corresponding to the vehicle state may be displayed on the liquid-crystal panel. For example, on the liquid-crystal panel of the multi-function switch 34, the text "anti-glare" indicating the transition to the anti-glare mode may be displayed while the vehicle is traveling, and the text "adjustment" indicating the transition to the adjustment mode may be displayed while the vehicle is stopped. Furthermore, the multi-function switch 34 may be configured to include a light source such as an LED or the like, and the color of the light emitted by the multi-function switch 34 may be changed according to the vehicle state.

In addition, the setting information and the like may be displayed on a display other than the display 2 provided in the vehicle.

Moreover, when the camera 1 is not activated, the camera 1 may be activated by operating the multi-function switch 34.

Moreover, configuration may be such that the anti-glare mode may be switched ON or OFF by operating the multi-function switch 34 while traveling.

The specific setting information of the system may also be changed by continuously pressing the multi-function switch 34 for a specified period. For example, even when the menu for setting the anti-glare mode is not displayed, the anti-glare mode may be switched ON and OFF by continuously pressing the multi-function switch 34 for a specified period.

In addition, by continuously pressing the multi-function switch 34 for a specified period, the ECU 5 may execute a process selected from a plurality of set processes according to the state of the vehicle. Moreover, the specific setting information of the system may be changed by releasing the multi-function switch 34 before a specified period elapses after being pressed.

Furthermore, in the first embodiment described above, an example in which the electronic mirror system is mounted in a vehicle traveling in an area having traffic restrictions such that the vehicle travels on the left side has been described; however, the electronic mirror system may be mounted in a vehicle traveling in an area having traffic restrictions such that the vehicle travels on the right side.

(Conclusion)

The electronic mirror system according to the present disclosure includes a camera for capturing images of surroundings of the vehicle; a display unit for displaying an image captured by the camera; a switch unit including an adjustment switch and a multi-function switch; and a control unit for performing a process according to a signal from the switch unit.

In the electronic mirror system, when the multi-function switch is operated, the control unit executes a process selected from a plurality of set processes according to a state of the vehicle; and in a case where the executed process is a transition to a mode for changing setting information of the system, and when the adjustment switch is operated after the transition, the control unit changes the setting information according to a signal from the adjustment switch.

In this way, the process performed when the multi-function switch is operated changes according to the vehicle state. As the adjustment switch for changing the setting information of the system, a mirror angle adjustment switch of the optical side mirrors or the like may be used. Therefore, it is not necessary to newly install a switch for each of a plurality of set processes, and it is possible to suppress an increase in the number of switches.

What is claimed is:

1. An electronic mirror system mounted in a vehicle, comprising:
a camera for capturing images of surroundings of the vehicle;
a display unit for displaying an image captured by the camera;
a switch unit including an adjustment switch and a multi-function switch; and
a control unit for performing a process according to a signal from the switch unit; wherein
the adjustment switch is used for adjusting at least an image area displayed on the display unit,
when the multi-function switch is operated, the control unit executes a process selected from a plurality of set processes according to a state of the vehicle, and in a case where the executed process is a transition to a mode for changing setting information of the system, and when the adjustment switch is operated after the transition, the control unit changes the setting information according to a signal from the adjustment switch,
when the multi-function switch is operated while the vehicle is stopped, the control unit performs a transition to an adjustment mode for changing setting information of the system, and when the adjustment switch is operated in that adjustment mode, the control unit changes the setting information according to a signal from the adjustment switch,
the control unit stores a plurality of setting information related to the display unit or the camera,
a plurality of adjustment modes is prepared corresponding to a plurality of setting information,
the adjustment switch includes a first adjustment key for selecting one adjustment mode from the plurality of adjustment modes, and a second adjustment key that is different from the first adjustment key, and
when the first adjustment key is operated in one of a plurality of adjustment modes, the control unit transitions from the adjustment mode to another adjustment mode, and when the second adjustment key is operated, the control unit changes setting information related to the display unit or the camera according to a signal from the second adjustment key.

2. The electronic mirror system according to claim 1, wherein,
when the multi-function switch is operated in the adjustment mode, the control unit ends the adjustment mode and transitions to a normal mode.

3. The electronic mirror system according to claim 1, wherein
the control unit stores a plurality of setting information related to the display unit or the camera;
a plurality of adjustment modes are prepared corresponding to a plurality of setting information; and,
when the multi-function switch is operated while the vehicle is stopped, the control unit sequentially switches between the plurality of adjustment modes and a normal mode, and when the adjustment switch is operated in one adjustment mode of the plurality of adjustment modes, the control unit changes setting information related to the display unit or the camera according to a signal from the adjustment switch.

4. The electronic mirror system according to claim 1, wherein,
when the multi-function switch is operated while the vehicle is traveling, the control unit changes a display mode of the display unit.

5. The electronic mirror system according to claim 1, wherein,
when the multi-function switch is operated when the camera or the display unit is not activated, the control unit activates the camera or the display unit.

6. The electronic mirror system according to claim 1, wherein,
when the multi-function switch is continuously pressed for a specified period, the control unit changes specific setting information of the system.

7. The electronic mirror system according to claim 1, wherein,
when the multi-function switch is continuously pressed for a specified amount of time, the control unit executes a process selected from a plurality of set processes according to a state of the vehicle, and when the multi-function switch is released before a specified period elapses after being pressed, the control unit changes specific setting information of the system.

* * * * *